UNITED STATES PATENT OFFICE.

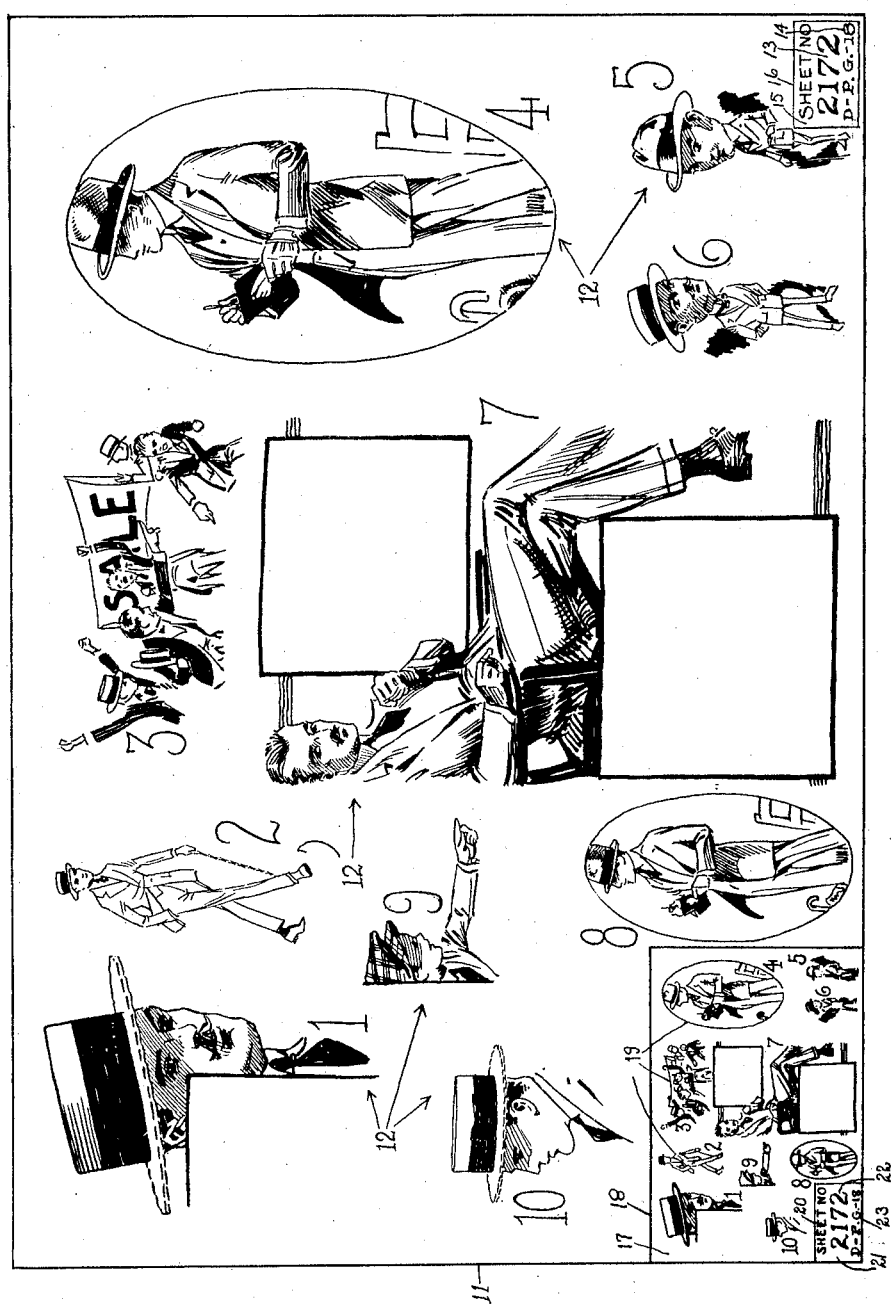

FRED J. RUNDE, OF BROOKLYN, NEW YORK.

PROOF-SHEET.

1,331,676. Specification of Letters Patent. Patented Feb. 24, 1920.

Application filed July 30, 1918. Serial No. 247,464.

*To all whom it may concern:*

Be it known that I, FRED J. RUNDE, a citizen of the United States of America, residing in Brooklyn, in the county of Kings and the State of New York, have invented a new and useful Proof-Sheet, of which the following is a specification.

This invention relates to proof sheets for advertising, selling and cataloguing cuts, or matrices for casting cuts, to be used for advertising or other purposes.

One of the objects of my invention is to provide, with each proof sheet, a reduced index sheet, or "miniature," showing the proof sheet reproduced in book, pocket, postal card, index card or desk size.

Another object of the invention is to provide a economical and convenient arrangement of the proof sheet and miniature so that the sheet and key number of the proof sheet may appear in full legible size, both on the miniature and the larger proof sheet, without disturbing the proper relation between the miniature and the proof sheet as a whole.

These and other objects of my invention will appear as the nature of the invention is further disclosed, and while herein details of the invention are described, the invention is not limited to these, as the details and arrangement of the various features of the invention may be greatly varied without departing from the spirit and scope of the invention as claimed.

In the accompanying drawing, showing by way of example, one of many possible embodiments of my invention, the figure is a face view of the improved proof sheet.

The embodiment of my invention as herein shown comprises a proof sheet 11 preferably, but not necessarily, of paper on which are placed a group of illustrations 12 of the cuts, of their matrices, which are to be sold, advertised or the like.

Each sheet is provided with a sheet number 13 and a key number 14 in a convenient area 15 of the sheet, which may be inclosed by a boundary line 16.

At a convenient part of the proof sheet, there is provided a delineated area 17 bounded by framing lines 18 forming a rectangle or "miniature" in which are a smaller group of reductions 19 of said illustrations 12. Within said area 17 are border lines 20 inclosing a delineated smaller space 21, also containing the sheet and key numbers, as at 22 and 23, of easily legible size and almost the same size as the numbers 13 and 14.

The border line 20 and the group of reductions 19 together form a substantially exact reduction—in the present case about one fourth size—of the framing lines 18 and the full size group of illustrations 12; and the space 21, therefore, occupies the same relation to the area 17 that the area 17 does to the proof sheet as a whole. This arrangement has for its function and is necessary in order to provide in the space 21 sufficient room for the sheet and key numbers to be printed in full size letters that may be easily read.

There may be provided any convenient number of illustrations 12; and associated therewith there may be provided any convenient identifying characters or numbers, as for instance, the figures or numerals "1" to "10" shown herein. The same numerals, correspondingly reduced, are shown associated with the respective reductions 19.

These miniatures are placed on the "mats" like regular cuts, and give an additional area of illustrations having, and imparting to the proof sheets, among others, the following advantages. They may be used:

(1) Pasted on index cards and kept as ordinary index cards for present or future needs;

(2) As desk indexes for big space buyers;

(3) As an index for advertising managers' desks;

(4) In book or pocket guide form for pocket files for solicitors, or for compact files generally;

(5) As inclosures, or printed on post cards, for circularizing special prospects;

(6) To illustrate reading ads;

(7) For the small space advertiser;

(8) For suggestive heads for classified ad columns, and (9) For individual classified ads.

I claim as my invention:

1. A proof sheet provided with a full size group of illustrations; a sheet number of the proof sheet; and a delineated area containing a smaller group of illustrations and a delineated smaller space; said smaller space and said smaller group together forming a substantially exact reduction of said full size group and said area; said smaller space containing the proof sheet number in easily legible style; said smaller space bearing in size, shape and location, the same relation to said area that said area bears to the proof sheet as a whole.

2. A proof sheet provided with a main group of illustrations; a delineated area bounded by framing lines and forming an inclosure containing a smaller group of illustrations and border lines forming a delineated smaller space containing a sheet number in easily legible style; said border lines and smaller group forming a substantially exact reduction of said main group and framing lines; said border lines bearing the same relation to said framing lines that said framing lines bear to the edges of the proof sheet as a whole.

FRED J. RUNDE.